United States Patent
Dai et al.

(10) Patent No.: US 11,923,585 B2
(45) Date of Patent: Mar. 5, 2024

(54) LOW LOSS INLET HEADER FOR FUEL CELLS

(71) Applicant: Hamilton Sundstrand Corporation, Charlotte, NC (US)

(72) Inventors: Zhongtao Dai, West Hartford, CT (US); Andrzej E. Kuczek, Bristol, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 91 days.

(21) Appl. No.: 17/714,334

(22) Filed: Apr. 6, 2022

(65) Prior Publication Data

US 2023/0327169 A1 Oct. 12, 2023

(51) Int. Cl.
*H01M 8/2483* (2016.01)
*H01M 8/026* (2016.01)
*H01M 8/2485* (2016.01)

(52) U.S. Cl.
CPC ......... *H01M 8/2483* (2016.02); *H01M 8/026* (2013.01); *H01M 8/2485* (2013.01)

(58) Field of Classification Search
CPC .. H01M 8/2483; H01M 8/026; H01M 8/2485; H01M 8/2484
See application file for complete search history.

(56) References Cited

U.S. PATENT DOCUMENTS

| 6,179,342 | B1 | 1/2001 | Shen |
| 8,076,039 | B2 | 12/2011 | Whiton et al. |
| 8,679,696 | B2 | 3/2014 | Bogumil et al. |
| 2010/0190068 | A1* | 7/2010 | Miyajima ............... H01M 8/02 429/413 |
| 2012/0034545 | A1* | 2/2012 | Yamaura ........... H01M 8/04201 429/460 |
| 2013/0118878 | A1 | 5/2013 | Purcocks |
| 2014/0234743 | A1* | 8/2014 | Sasamoto ........... H01M 8/2485 429/456 |

FOREIGN PATENT DOCUMENTS

KR 100722411 B1 5/2007

OTHER PUBLICATIONS

1 Extended European Search Report issued in European Application No. 23162137.6 dated Oct. 16, 2023, 7 pages.

* cited by examiner

*Primary Examiner* — Helen Oi K Conley
(74) *Attorney, Agent, or Firm* — CANTOR COLBURN LLP (57) ABSTRACT

An inlet header having: an inner end, an outer end, a plurality of segments therebetween, including: an outer segment that extends from the outer end to a first intermediate end, the outer segment defines a cylindrical profile; a first intermediate segment that forms an outer elbow and extends from the first intermediate end to a second intermediate end, the second intermediate end has a rectangular shape, and the first intermediate segment increases in width proportionally as it extends toward the second intermediate end; a second intermediate segment that extends from the second intermediate end to a third intermediate end, the third intermediate end has a rectangular shape, and the second intermediate segment increases in width and height proportionally as it extends toward the third intermediate end; and an inner segment that forms an inner elbow and extends from the third intermediate end to the inner end of the inlet header.

20 Claims, 5 Drawing Sheets

LOW LOSS INLET HEADER FOR FUEL CELLS

BACKGROUND

The embodiments related to fuel cells and more specifically to a low loss inlet header for fuel cells.

A fuel cell is an electrochemical cell that converts the chemical energy of a fuel, such as hydrogen, and an oxidizing agent, such as oxygen, into electricity through chemical reduction-oxidation reactions. For an optimized utilization of light and efficient fuel cells, inlet headers should be configured to produce minimal pressure losses and provide uniform feed to each channel within the fuel cell. In addition, inlet headers and outlets are all located on the same side of fuel cell.

SUMMARY OF THE DISCLOSURE

Disclosed is an inlet header for a fuel cell including: an inner end configured to be located against a plate stack of the fuel cell, an outer end spaced apart from the inner end, and a plurality of segments between the inner end and the outer end, and the plurality of segments include: an outer segment that extends from the outer end to a first intermediate end, wherein the outer segment defines a cylindrical profile; a first intermediate segment that forms an outer elbow and extends from the first intermediate end to a second intermediate end, wherein the second intermediate end has a rectangular shape, and wherein the first intermediate segment increases in width proportionally as it extends toward the second intermediate end; a second intermediate segment that extends from the second intermediate end to a third intermediate end, wherein the third intermediate end has a rectangular shape, and wherein the second intermediate segment increases in width and height proportionally as it extends toward the third intermediate end; and an inner segment that forms an inner elbow and extends from the third intermediate end to the inner end of the inlet header.

In addition to one or more aspects of the inlet header, or as an alternate, the outer end of the inlet header defines a header inlet flow area; the inner end of the inlet header defines a header outlet flow area; the first intermediate end defines a first flow area; the second intermediate end defines a second flow area; the third intermediate end defines a third flow area; and the inlet header defines one or more of: a first ratio of width to height of the second flow area that is between 20 and 25; a second ratio of height of the second flow area to height of the third flow area that is between 0.25 and 0.75; a third ratio of the second flow area to the first flow area that is between 1.5 and 2; a fourth ratio of the second flow area to the third flow area that is between 3.5 and 4; a fifth ratio of the header outlet flow area to the third flow area that is between 1.25 and 1.75; a sixth ratio of the header inlet flow area to the header outlet flow area that is between 8 and 15; or a seventh ratio of an overall length of the inlet header to the inlet header diameter that is between 3 and 7.

In addition to one or more aspects of the inlet header, or as an alternate, the first intermediate segment defines first and second sidewalls; and an interior angle defined between the first and second sidewalls is between 50 and 120 degrees.

In addition to one or more aspects of the inlet header, or as an alternate, the second intermediate segment defines third and fourth sidewalls; and near the third intermediate end of the second intermediate segment, a first set of vanes is formed adjacent to the third sidewall and a second set of vanes is formed adjacent to the fourth sidewall, each of vanes defining a walled slot extending through the second intermediate segment.

In addition to one or more aspects of the inlet header, or as an alternate, the vanes have a same shape as each other; and each of the vanes defines an inner end and an outer end to define a vane length, wherein the inner end is closer to the third intermediate end than the outer end.

In addition to one or more aspects of the inlet header, or as an alternate, an aspect ratio of each of the vanes is between 3 and 5.

In addition to one or more aspects of the inlet header, or as an alternate, the vanes are configured symmetrically about a center of the second intermediate segment.

In addition to one or more aspects of the inlet header, or as an alternate, the first set of vanes are mutually parallel.

In addition to one or more aspects of the inlet header, or as an alternate, within the first set of vanes, a ratio of spacing between adjacent ones of the vanes to the vane length is between 1 and 3.

In addition to one or more aspects of the inlet header, or as an alternate, the first set of vanes are oriented so that the respective outer ends are closer to the third sidewall than the inner ends.

In addition to one or more aspects of the inlet header, or as an alternate, each of the vanes defines a pitch angle of between 0 and 25 degrees relative to the center of the second intermediate segment.

In addition to one or more aspects of the inlet header, or as an alternate, one of the vanes in the first set of vanes abuts the third sidewall to provide a discontinuity within the second intermediate segment along the third sidewall.

In addition to one or more aspects of the inlet header, or as an alternate, the second intermediate segment includes between 2 and 16 of the vanes.

Disclosed is a fuel cell, including: a bipolar plate stack that has a first end and defines a first inlet manifold; and an inlet header having one or more of the above disclosed aspects.

In addition to one or more aspects of the fuel cell, or as an alternate, the inlet header is a first inlet header, and the plate stack defines a first outlet manifold that is fluidly coupled to the first inlet manifold to define a first flow circuit, wherein the first outlet manifold includes a first outlet that is located against the first end of the plate stack.

In addition to one or more aspects of the fuel cell, or as an alternate, the first flow circuit includes an oxidizer.

In addition to one or more aspects of the fuel cell, or as an alternate, the oxidizer is air or oxygen.

In addition to one or more aspects of the fuel cell, or as an alternate, the plate stack defines: a second inlet manifold and a second outlet manifold that are fluidly coupled with each other to define a second flow circuit that includes hydrogen, wherein the second inlet manifold includes a second inlet header and the second outlet manifold includes a second outlet; and a third inlet manifold and a third outlet manifold that are fluidly coupled with each other to define a third flow circuit that includes water, wherein the third inlet manifold includes a third inlet header and the third outlet manifold includes a third outlet.

In addition to one or more aspects of the fuel cell, or as an alternate, each of the manifolds is disposed against the first end of the plate stack, and a header end plate is disposed against the first end of the plate stack and surrounds each of the inlet headers and outlets.

In addition to one or more aspects of the fuel cell, or as an alternate, the plate stack includes adjacently disposed plates, each of the plates defining an inlet manifold orifice and an outlet manifold orifice, and cell channels that are fluidly coupled to one of the flow circuits and fluidly isolated from the other ones of the flow circuits.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
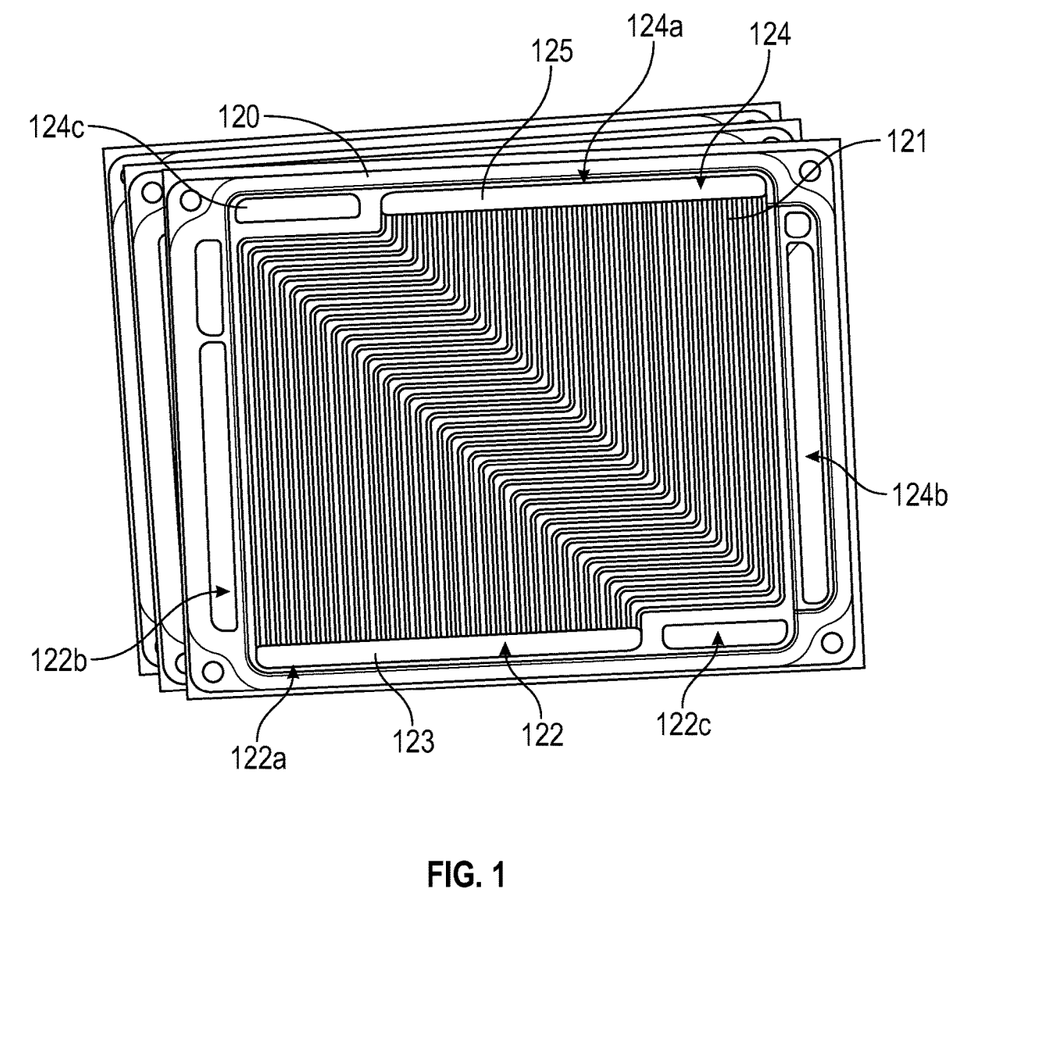
FIG. 1 shows a plate of the fuel cell stack.
Figure 2:
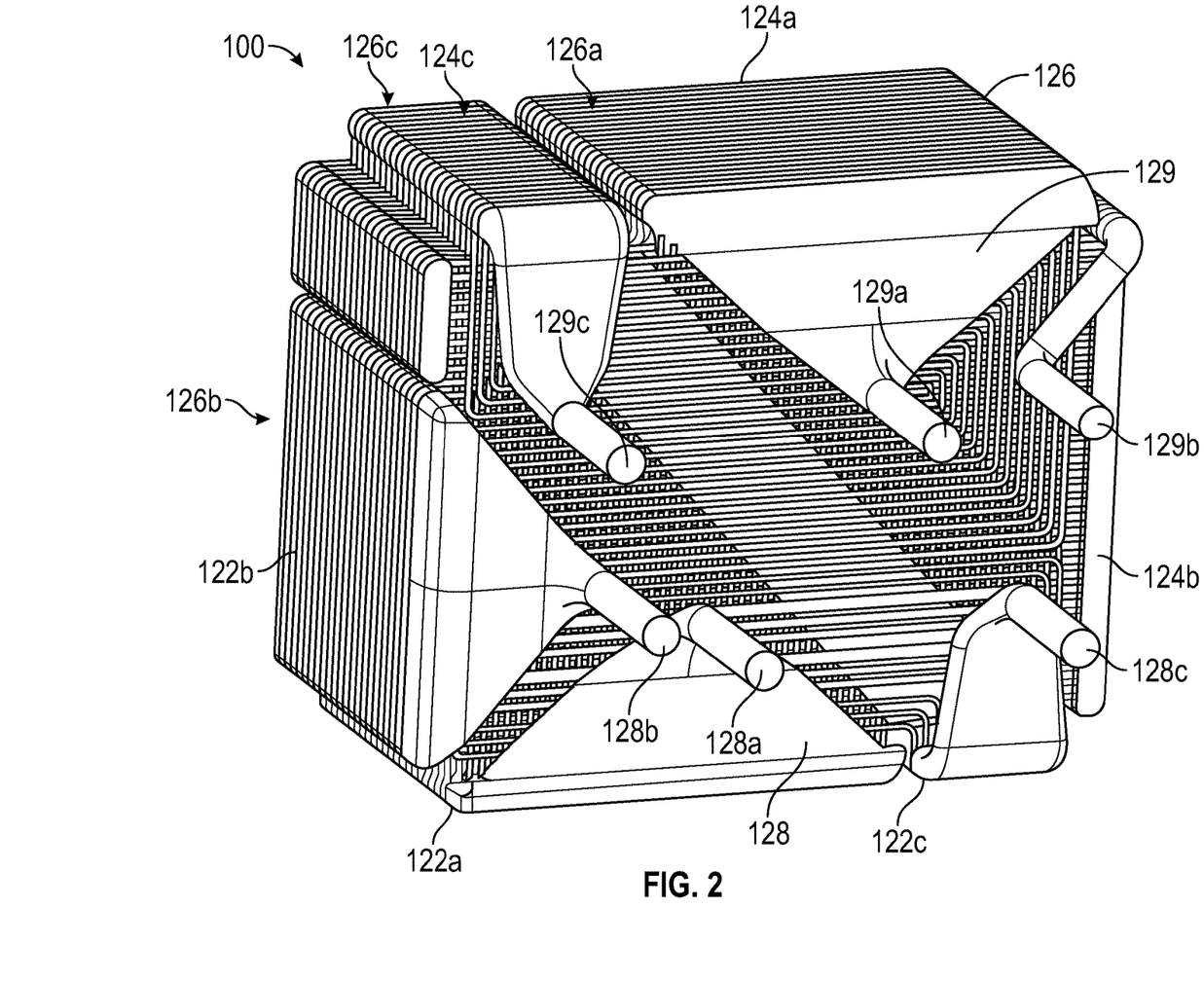
FIG. 2 shows the fluid flow paths through the plates of the fuel cell stack and through header inlets and outlets.
Figure 3:
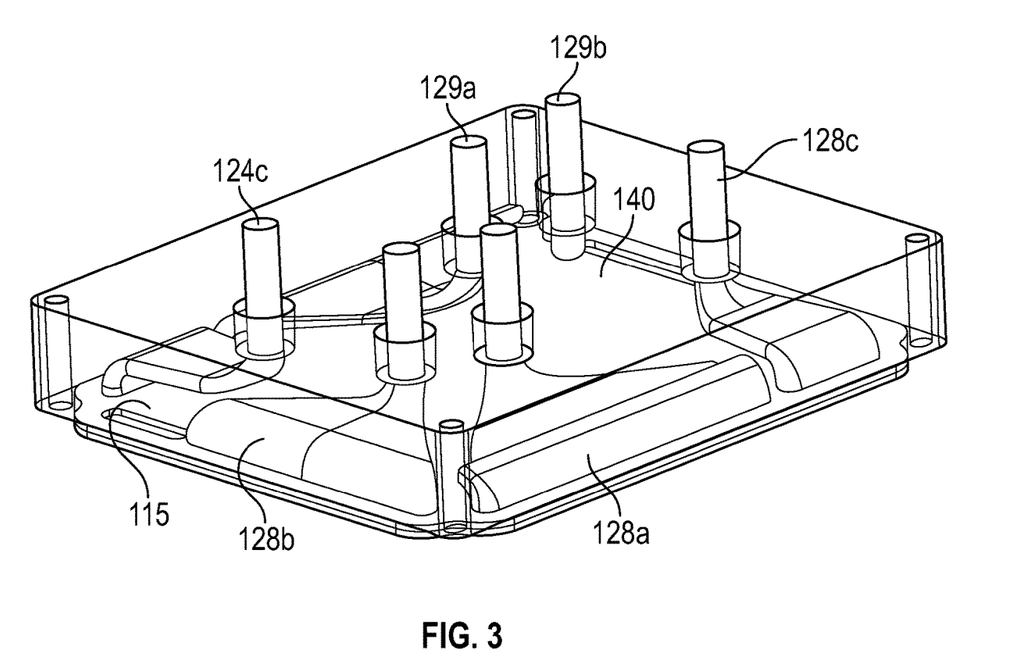
FIG. 3 shows an end plate against one end of the plate stack that encloses the header inlets and outlets.

Regarding the figures, it should be noted that that FIG. 1 shows hardware, while FIGS. 2 to 8 show a space that fluid occupies, e.g., a fluid flow path within the hardware. Turning now to FIGS. 1-3, these figures generally show a fuel cell 100 according to an embodiment. As shown in FIG. 1, the fuel cell 100 includes a bipolar plate stack, or plate stack 110. The plate stack 110 includes plates 120, each plate 120 defines cell channels 121, which are grooves in a plane of a plate 120. Each plate 120 also defines an inlet manifold orifice 123 and an outlet manifold orifice 125. In the plate stack 110, the inlet and outlet manifold orifices 123, 125 collectively form inlet and outlet manifolds 122, 124 that define flow paths through the plate stack 110 and direct flow to, or receive flow from, the cell channels 121 on certain ones of the plates.

Turning to FIG. 2, the cell stack 100 defines flow circuits 126, which are fluidly coupled inlet manifolds 122, outlet manifolds 124 and cell channels 121. Each flow circuit 126 has an inlet header 128 fluidly coupled to its inlet manifold 122 and an outlet 129 fluidly coupled to its outlet manifold 124. It should be appreciated that FIG. 2 shows the resulting fluid flow through the plates of the fuel cell 100 rather than the plate stack 110.

More specifically, the plate stack 110 defines a first inlet manifold 122A and a first outlet manifold 124A that are fluidly coupled to each other to define a first flow circuit 126A that includes an oxidizer, which may be air or oxygen. A first inlet header 128A is fluidly coupled to the first inlet manifold 122A and a first outlet 129A is fluidly coupled to the first outlet manifold 124A. The plate stack 110 defines a second inlet manifold 122B and a second outlet manifold 124B that are fluidly coupled with each other to define a second flow circuit 126B that includes fuel, which may be hydrogen. The second inlet manifold 122B is fluidly coupled to a second inlet header 128B and the second outlet manifold 124B is fluidly coupled to a second outlet 129B. The plate stack 110 defines a third inlet manifold 122C and a third outlet manifold 124C that are fluidly coupled with each other to define a third flow circuit 126C, that includes water. The third inlet manifold 122C is fluidly coupled to a third inlet header 128C and the third outlet manifold 124C is fluidly coupled to a third outlet 129C.

As shown in FIG. 3, each of the inlet headers 128 and outlets 129 are disposed against a first end 140 of the plate stack 110. A header end plate 115, disposed against the first end 140 of the plate stack 110, surrounds each of the inlet headers 128 and outlets 129.

FIGS. 4-7 show the first inlet header 128A in which the oxidizer flows. The first inlet header 128A is optimized for light and efficient fuel cells having a fuel flow path, an oxidizer flow path and a cooling flow path. The first inlet header 128A is configured to provide a desired flow rate through the fuel cell 100, produce minimal pressure loss and provide uniform feed to each channel.

More specifically, the first inlet header 128A includes an inner end 300 located against the plate stack 110, an outer end 310 spaced apart from the inner end 300, and a plurality of segments 320 between the inner end 300 and the outer end 310.

The plurality of segments 320 include an outer segment 320A that extends from the outer end 310 to a first intermediate end 330A, defining inlet and outlet ends of the outer segment 320A. The outer segment 320A defines a cylindrical profile and is oriented normal to the plate stack 110 and parallel to a direction of flow through the first inlet manifold 122A. That is, the outer segment 320A has a uniform circular cross section between its opposite ends.

Figure 4:
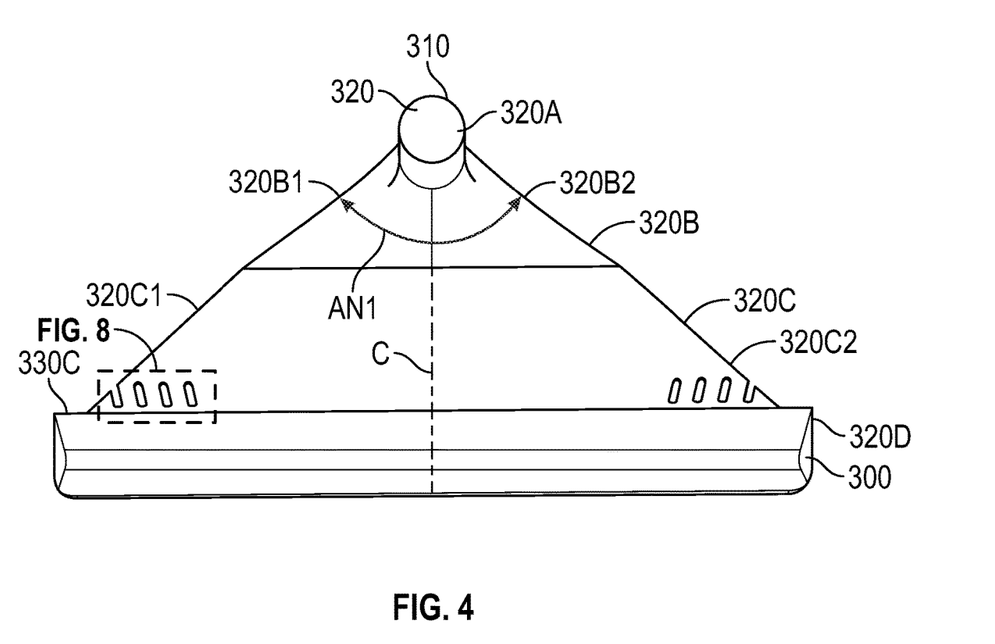
FIG. 4 shows an elevational view of the first inlet header.
Figure 5:
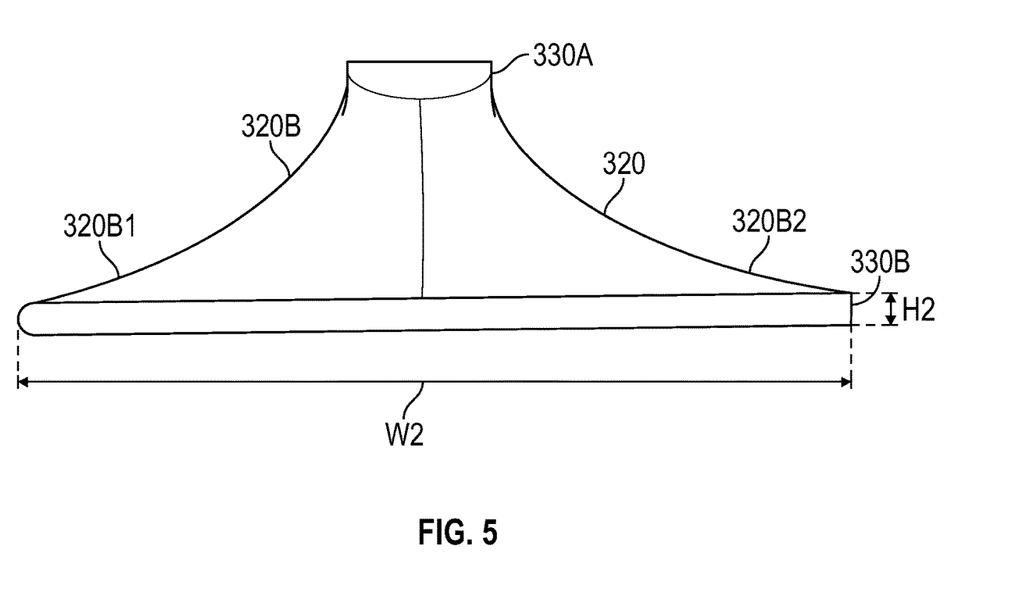
FIG. 5 shows a first intermediate segment of the first inlet header.

A first intermediate segment 320B forms an outer elbow and extends from the first intermediate end 330A to a second intermediate end 330B, defining the inlet and outlet ends of the first intermediate segment 320B. That is, the first intermediate segment 320B forms a perpendicular bend such that the second intermediate end 330B is closer to the first inlet manifold 122A than the first intermediate end 330A. The second intermediate end 330B faces a direction that is perpendicular to the direction of flow through the first outer segment and the inlet manifold 122A and parallel to a direction of channel flow within the plate stack 110. It is to be appreciated that a shape of the inlet end of the first intermediate segment 320B matches that of the first intermediate end 330A. The second intermediate end 330B has a rectangular shape rather than a circular shape at the first intermediate end 330A. The first intermediate segment 320B increases in width proportionally as it extends toward the second intermediate end 330B. That is, its shape fans out in an elevated view (FIG. 4).

A second intermediate segment 320C extends from the second intermediate end 330B to a third intermediate end 330C, defining inlet and outlet ends of the second intermediate segment 320C. It is to be appreciated that a shape of the inlet end of the second intermediate segment 320C matches that of the second intermediate end 330B. The third intermediate end 330C has a rectangular shape as well. The second intermediate segment 320C increases in width and height proportionally as it extends toward the third intermediate end 330C. The proportionality of the increase differs for the width and height in that the height change is less than the width change. That is, the second intermediate segment fans out at a same rate as the first intermediate segment in the elevated view (FIG. 4). Due to the width change, the second intermediate segment 320C forms a trapezoidal profile in an elevated view from the second intermediate end 330B to the third intermediate end 330C.

An inner segment 320D extends from the third intermediate end 330C to the inner end 300 of the first inlet header 128A, defining inlet and outlet ends of the inner segment 320D. The third intermediate end 330C may be smaller than the inlet end of the inner segment 320D to form a dump diffuser. The inner segment 320D forms an inner elbow. The inner segment 320D forms a perpendicular bend so that its outlet faces a direction that is parallel with the direction of flow through the outer segment and the first inlet manifold 122A. It is to be appreciated that a shape of the outlet end of the inner segment 320D is complementary to that of the first inlet manifold 122A.

Figure 6:
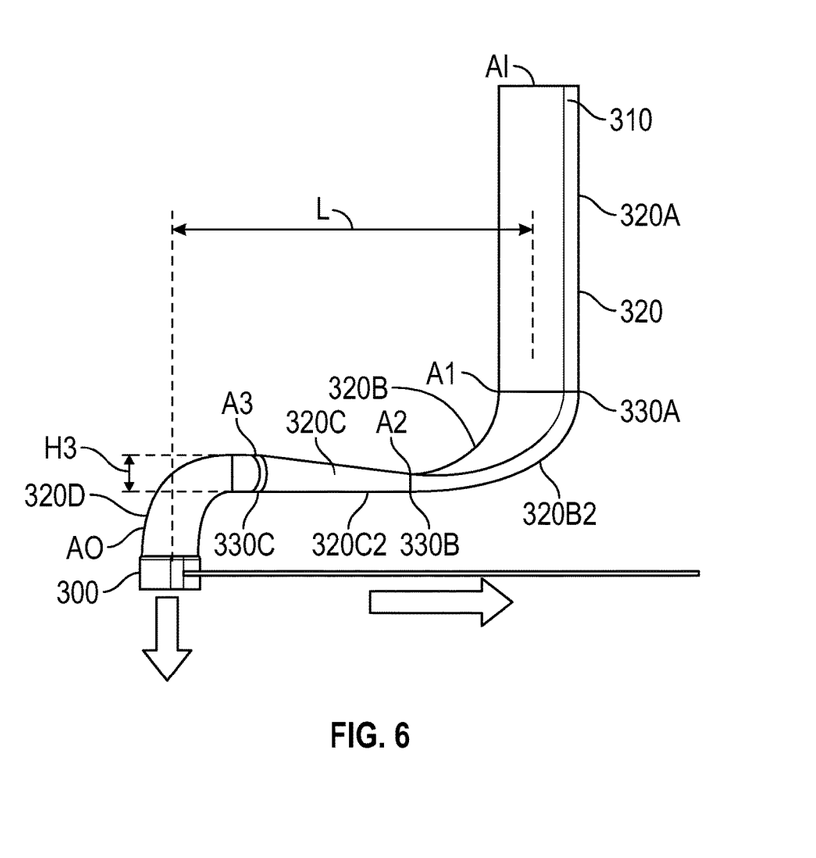
FIG. 6 shows a side view of the first inlet header.
Figure 7:
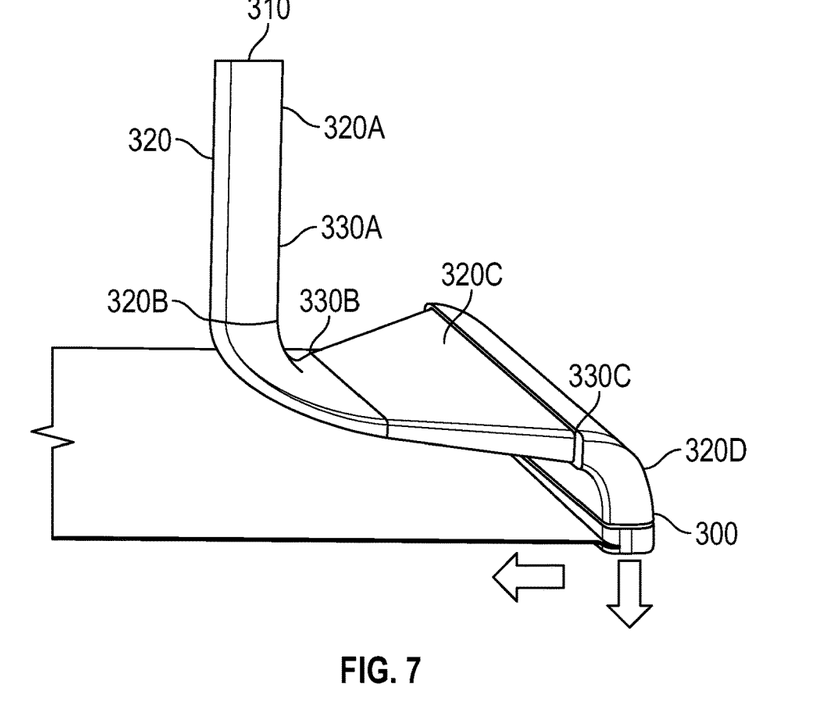
FIG. 7 shows another side view of the first inlet header.

Regarding geometric relationships of the inlet header segments, the outer end 310 of the first inlet header 128A defines a header inlet flow area AI and the inner end 300 of the first inlet header 128A defines a header outlet flow area AO (FIG. 6). The first intermediate end 330A defines a first flow area A1, the second intermediate end 330B defines a second flow area A2, and the third intermediate end 330C defines a third flow area A3. According to an embodiment, a first ratio of width W2 to height H2 (FIG. 5) of the second flow area A2 may be between 20 and 25, and is preferably 23. A second ratio of height H2 of the second flow area to height H3 (FIG. 6) of the third flow area A3 may be between 0.25 and 0.75, and is preferably 0.5. A third ratio of the second flow area A2 to the first flow area A1 may be between 1.5 and 2, and is preferably 1.8. A fourth ratio of the second flow area A2 to the third flow area A3 may be between 3.5 and 4, and is preferably 3.7. A fifth ratio of the header outlet flow area AO to the third flow area A3 may be between 1.25 and 1.75, and is preferably 1.5. A sixth ratio of the header inlet flow area A1 to the header outlet flow area AO may be between 8 and 15, and is preferably 11. A seventh ratio of the overall length L, which is measured from the center of A1 to the center of AO, to the inlet header diameter may be between 3 and 7, and is preferably 4.5. In one embodiment, the first intermediate segment 320B defines first and second sidewalls 320B1, 320B2. An interior angle AN1 is defined between the first and second sidewalls 320B1, 320B2, which may be between 50 and 120 degrees (FIG. 4). As shown and described herein, the second intermediate segment is either smoothly connected to the inner segment or rapidly expanded to the inner segment to form a dump diffuser.

As shown in FIG. 4, according to the illustrated embodiment, the second intermediate segment 320C defines third and fourth sidewalls 320C1, 320C2. Near the third intermediate end 330C of the second intermediate segment 320C, a first set of vanes 340A is defined adjacent to the third sidewall 320C1 and a second set of vanes 340B is defined adjacent to the fourth sidewall 320C2. Each of the vanes (generally referenced as 340) defines a walled slot extending through the second intermediate segment 320C. That is, the vanes 340 do not define an opening in the second intermediate segment 320C but rather an internal local flow barrier, e.g., such as internal baffles.

The vanes 340 may have a same shape as each other. Each of the vanes 340 may define an inner end 350A and an outer end 350B to define a vane length L. The inner end 350A may be closer to the third intermediate end 330C, i.e., the inner segment 320D, than the outer end 350B. An aspect ratio of each of the vanes 340 may be between 3 and 5, and is preferably 4. The second intermediate segment 320C may include between 2 and 16 vanes, preferably 8 vanes.

In the illustrated embodiment, the vanes 340 are configured symmetrically about a center C extending from the inlet to the outlet of the second intermediate segment 320C. As such, and for simplicity, a discussion of the first set of vanes 340A will apply to the second set of vanes 340B.

Figure 8:
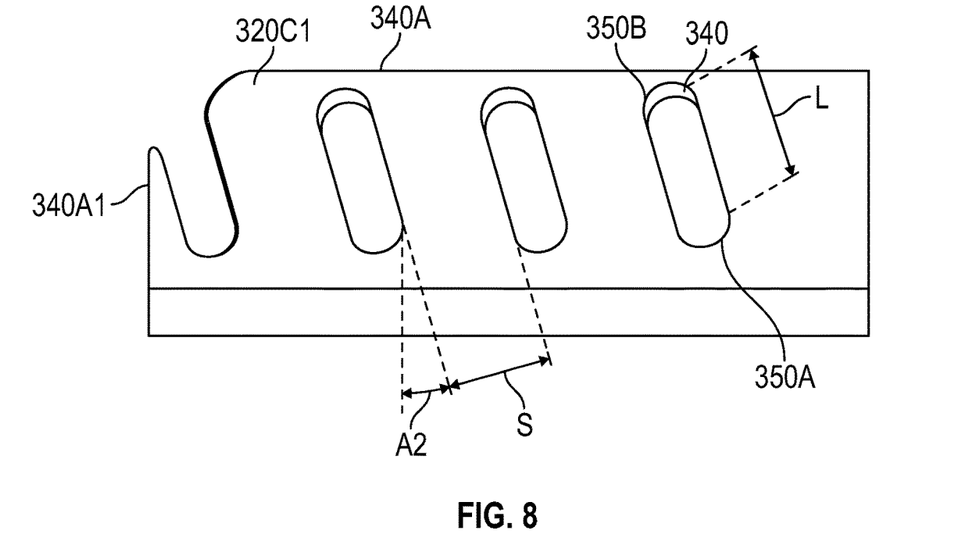
FIG. 8 shows a detail of FIG. 4, showing vanes utilized in the first inlet header.

Turning to FIG. 8, the first set of vanes 340A may be mutually parallel. Within the first set of vanes 340A, a ratio of spacing S between adjacent vanes 340 to vane length L is between 1 and 3 and is preferably 2. The first set of vanes 340 are oriented so that the respective outer ends 350B are closer to the third sidewall 320C1 than the inner ends 350A. Each of the vanes 340 defines a pitch angle A2 of between zero and 25 degrees, preferably between zero and 20 degrees, relative to the center C of the second intermediate segment 320C. One of the vanes 340A1 in the first set of vanes 340 abuts the third sidewall 320C1 to provide a discontinuity within the second intermediate segment 320C along the third sidewall 320C1. That is, flow in the second intermediate segment 320C will be prevented from flowing continuously against the third sidewall 320C1 from the inlet to the outlet of the second intermediate segment 320C. The resulting angular flow barrier at the third sidewall 320C1 will redirect flow toward the center C, as the flow leaves the second intermediate segment 320C. With less flow against the sidewalls, there will be less drag against the fluid resulting in a lower pressure loss, which results in a reduced loss of the fluid flow rate into and through the fuel cell 100. Within the scope of the embodiments are other flow barrier shapes, such as cylindrical flow barriers instead of slots.

With the above ratios, angles, and vanes, the first inlet header 128A is configured to provide a desired flow rate through the fuel cell with minimal loss and uniform feed to each channel. For example, the design of the first and second intermediate segment, together, results in an effective turn of flow without flow separation, reducing pressure loss and recover dynamic head. The inlet header has a larger exit to inlet area ratio within a short distance which results in a compact design that optimizes flow into the inlet manifold such that, even with a large number of cell channels, a Mach number of less than 0.3 is typical for the flows. Thus, the embodiments provide an optimized inlet header for light and efficient fuel cells having a fuel flow path, an oxidizer flow path and a cooling flow path.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An inlet header for a fuel cell comprising:
an inner end configured to be located against a plate stack of the fuel cell, an outer end spaced apart from the inner end, and a plurality of segments between the inner end and the outer end, and the plurality of segments include:
   an outer segment that extends from the outer end to a first intermediate end, wherein the outer segment defines a cylindrical profile;
   a first intermediate segment that forms an outer elbow and extends from the first intermediate end to a second intermediate end, wherein the second intermediate end has a rectangular shape, and wherein the first intermediate segment increases in width proportionally as it extends toward the second intermediate end;
   a second intermediate segment that extends from the second intermediate end to a third intermediate end, wherein the third intermediate end has a rectangular shape, and wherein the second intermediate segment increases in width and height proportionally as it extends toward the third intermediate end; and
   an inner segment that forms an inner elbow and extends from the third intermediate end to the inner end of the inlet header.

2. The inlet header of claim 1, wherein:
the outer end of the inlet header defines a header inlet flow area;
the inner end of the inlet header defines a header outlet flow area;
the first intermediate end defines a first flow area;
the second intermediate end defines a second flow area;
the third intermediate end defines a third flow area; and
the inlet header defines one or more of:
   a first ratio of width to height of the second flow area that is between 20 and 25;
   a second ratio of height of the second flow area to height of the third flow area that is between 0.25 and 0.75;
   a third ratio of the second flow area to the first flow area that is between 1.5 and 2;
   a fourth ratio of the second flow area to the third flow area that is between 3.5 and 4;
   a fifth ratio of the header outlet flow area to the third flow area that is between 1.25 and 1.75;
   a sixth ratio of the header inlet flow area to the header outlet flow area that is between 8 and 15; or
   a seventh ratio of an overall length of the inlet header to the inlet header diameter that is between 3 and 7.

3. The inlet header of claim 1, wherein:
the first intermediate segment defines first and second sidewalls; and
an interior angle defined between the first and second sidewalls is between 50 and 120 degrees.

4. The inlet header of claim 3, wherein:
the second intermediate segment defines third and fourth sidewalls; and
near the third intermediate end of the second intermediate segment, a first set of vanes is formed adjacent to the third sidewall and a second set of vanes is formed adjacent to the fourth sidewall, each of vanes defining a walled slot extending through the second intermediate segment.

5. The inlet header of claim 4, wherein:
the vanes have a same shape as each other; and
each of the vanes defines an inner end and an outer end to define a vane length, wherein the inner end is closer to the third intermediate end than the outer end.

6. The inlet header of claim 5, wherein
an aspect ratio of each of the vanes is between 3 and 5.

7. The inlet header of claim 5, wherein
the vanes are configured symmetrically about a center of the second intermediate segment.

8. The inlet header of claim 7, wherein
the first set of vanes are mutually parallel.

9. The inlet header of claim 7, wherein
within the first set of vanes, a ratio of spacing between adjacent ones of the vanes to the vane length is between 1 and 3.

10. The inlet header of claim 7, wherein:
the first set of vanes are oriented so that the respective outer ends are closer to the third sidewall than the inner ends.

11. The inlet header of claim 7, wherein:
each of the vanes defines a pitch angle of between 0 and 25 degrees relative to the center of the second intermediate segment.

12. The inlet header of claim 7, wherein:
one of the vanes in the first set of vanes abuts the third sidewall to provide a discontinuity within the second intermediate segment along the third sidewall.

13. The inlet header of claim 7, wherein:
the second intermediate segment includes between 2 and 16 of the vanes.

14. A fuel cell, comprising:
a bipolar plate stack that has a first end and defines a first inlet manifold; and
the inlet header of claim 1.

15. The fuel cell of claim 14, wherein:
the inlet header is a first inlet header, and
the plate stack defines a first outlet manifold that is fluidly coupled to the first inlet manifold to define a first flow circuit, wherein the first outlet manifold includes a first outlet that is located against the first end of the plate stack.

16. The fuel cell of claim 15, wherein:
the first flow circuit includes an oxidizer.

17. The fuel cell of claim 16, wherein
the oxidizer is air or oxygen.

18. The fuel cell of claim 15, wherein
the plate stack defines:
a second inlet manifold and a second outlet manifold that are fluidly coupled with each other to define a second flow circuit that includes hydrogen, wherein the second inlet manifold includes a second inlet header and the second outlet manifold includes a second outlet; and
a third inlet manifold and a third outlet manifold that are fluidly coupled with each other to define a third flow circuit that includes water, wherein the third inlet manifold includes a third inlet header and the third outlet manifold includes a third outlet.

19. The fuel cell of claim 18, wherein
each of the manifolds is disposed against the first end of the plate stack, and a header end plate is disposed against the first end of the plate stack and surrounds each of the inlet headers and outlets.

20. The fuel cell of claim 19, wherein
the plate stack includes adjacently disposed plates, each of the plates defining an inlet manifold orifice and an outlet manifold orifice, and cell channels that are fluidly coupled to one of the flow circuits and fluidly isolated from the other ones of the flow circuits.

* * * * *